United States Patent
Kelsey et al.

(10) Patent No.: US 6,509,438 B2
(45) Date of Patent: Jan. 21, 2003

(54) OPTIMUM DIPROPYLENE GLYCOL CONTENT POLYTRIMETHYLENE TEREPHTHALATE COMPOSITIONS

(75) Inventors: Donald Ross Kelsey, Fulshear, TX (US); Betty Marrou Scardino, Katy, TX (US); Kailash Dangayach, Houston, TX (US); Houston Slade Brown, Houston, TX (US); Hans Reitz, Rosbach (DE); Eckhard Seidel, Frankfurt am Main (DE); Fritz Wilhelm, Karben (DE)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/840,411

(22) Filed: Apr. 23, 2001

(65) Prior Publication Data

US 2002/0009353 A1 Jan. 24, 2002

Related U.S. Application Data

(60) Provisional application No. 60/199,035, filed on Apr. 21, 2000.

(51) Int. Cl.[7] .................. C08G 63/78; C08G 63/82; C08G 63/87
(52) U.S. Cl. .................. 528/279; 528/285; 528/286; 528/302; 528/308.6
(58) Field of Search .................. 528/279, 280, 528/285, 286, 302, 308.6, 180, 181, 194, 195, 206, 212, 272

(56) References Cited

U.S. PATENT DOCUMENTS

| | | | |
|---|---|---|---|
| 4,434,276 A | * 2/1984 | Horlbeck et al. | 525/437 |
| 5,340,909 A | 8/1994 | Doerr et al. | 528/276 |
| 5,798,433 A | * 8/1998 | Schmidt et al. | 524/779 |
| 6,093,786 A | 7/2000 | Kelsey | 528/271 |
| 6,242,558 B1 | 6/2001 | Kelsey | 528/206 |
| 6,281,325 B1 | * 8/2001 | Kurian et al. | 524/176 |
| 6,316,101 B2 | * 11/2001 | Kato et al. | 428/364 |
| 6,335,421 B1 | * 1/2002 | Kurian et al. | 524/783 |

FOREIGN PATENT DOCUMENTS

| | | | |
|---|---|---|---|
| EP | 1016741 A1 | 3/1999 | |
| EP | 1046662 A1 | 10/2000 | |
| JP | 2001032136 A | 7/1999 | ............. D01F/6/84 |
| WO | WO 9911709 | 3/1999 | ............. C08L/67/02 |
| WO | WO 9911845 | 3/1999 | ............. D01F/6/62 |
| WO | WO 01/14450 A1 | 3/2001 | |
| WO | WO 01/58980 A1 | 8/2001 | ......... C08G/63/183 |
| WO | WO 01/58981 A1 | 8/2001 | ........... C08G/63/78 |
| WO | WO 01/58982 A1 | 8/2001 | ........... C08G/63/78 |

OTHER PUBLICATIONS

International Search Report of 30/10/01.
"Identification and Characterization of Reaction Byproducts in the Polymerization of Polyethylene Terephthalate," by J. M. Besnoin and K. Y. Choi, JMS–REV. Macromol. Chem. Phys., C29(1), 55–81 (1989) pp. 63–65.
"Synthesis and Properties of Fiber–Grade Poly(Trimethylene Terephthalate)," by H. L. Traub, P. Hirt, H. Herlinger, W. Oppermann, *Die Angewandte Makromolekulare Chemie* 230 (1995) pp. 179–187.

* cited by examiner

*Primary Examiner*—James J. Seidleck
*Assistant Examiner*—Travis B Ribar
(74) *Attorney, Agent, or Firm*—Donald F. Haas

(57) ABSTRACT

According to the invention, a polytrimethylene terephthalate is provided having 0.6 to less than 2 mole percent dipropylene glycol. Such compositions have a reduced tendency to generate acrolein when heated in air. These PTT polymer compositions exhibit improved and enhanced dyeability as compared to conventional PTT made by the DMT process and the TPA polycondensation/solid state polymerization processes.

5 Claims, No Drawings

OPTIMUM DIPROPYLENE GLYCOL CONTENT POLYTRIMETHYLENE TEREPHTHALATE COMPOSITIONS

This application claims the benefit of U.S. Provisional Application No. 60/199,035 filed Apr. 21, 2000, the entire disclosure of which is hereby incorporated by reference.

FIELD OF THE INVENTION

This invention relates to 1,3-propanediol-based polyesters such as polytrimethylene terephthalate. In one aspect, the invention relates to polytrimethylene terephthalate which exhibits an excellent combination of ease of dyeability of PTT fabrics and fibers and stability under oxidative conditions which can reduce the need for adding stabilizers. More particularly, the invention relates to a new polytrimethylene terephthalate composition which can be made by a new all-melt process which is a unique composition which has an optimum level of dipropylene glycol units.

BACKGROUND OF THE INVENTION

Polytrimethylene terephthalate (PTT) is primarily a linear aromatic polyester which can be prepared from the condensation polymerization of 1,3-propanediol (PDO) and terephthalic acid (TPA). It is useful for carpet and textile fiber applications. For such commercial applications, it is desired to produce a product which has an intrinsic viscosity greater than about 0.70 dl/g, preferably greater than 0.8 dl/g, and good color stability. It is also desired to produce polytrimethylene terephthalate from PDO and TPA which has low tendency to generate acrolein when the polymer is heated in air, as it commonly is during downstream processing such as spinning into fibers. It is known that this instability can be controlled with additives such as hindered phenols such as described in copending, commonly assigned U.S. patent application Modified Polytrimethylene Terephthalate, Ser. No. 09/756,595, filed Dec. 7, 1998). It would be desirable, however, to produce polytrimethylene terephthalate (PTT) having an inherent stability against acrolein generation, i.e., having a lower dipropylene glycol (DPG) content, and which also is easy to dye when used to make fibers and fabrics. The tendency to produce acrolein is related to the amount of dipropylene glycol produced in the polymer during polymerization. DPG affects the dyeing of PTT and generally for that reason, the DPG level in the polymer has to be controlled within a narrow range (e.g. +/−0.1%) so that the polymer will dye consistently from lot to lot. DPG is used here to mean the residual unit [—OCH$_2$CH$_2$CH$_2$OCH$_2$CH$_2$CH$_2$O—] in the polymer chain. The following formula shows how the DPG units are copolymerized into the polymer to form a random copolyester (and how some end groups, such as allyl, carboxyl, methyl ester, may be incorporated):

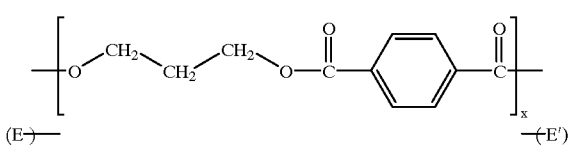

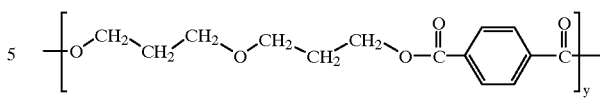

comprising units A and B connected randomly to each other by ester bonds and wherein E is an endgroup attached to the diol end and consisting of either H or the residuum of a hindered phenol (defined herein), E' is an endgroup attached to the carboxyl end and consisting of a PDO [—OCH$_2$CH$_2$CH$_2$OH], a DPG [—OCH$_2$CH$_2$CH$_2$OCH$_2$CH$_2$CH$_2$OH], an allyl [—OCH$_2$CH=CH$_2$] group, a hydroxy [—OH] or, in the case when terephthalate diesters are used, alkoxy [—OR] group, such as methoxy [—OCH$_3$], and where the average (or overall) molar proportion of DPG units to the total diol units, including endgroups, is the ratio of the sum of y+E' (where E' is the DPG endgroups only) to the sum of x+y+E' (where E' is the diol endgroups, including allyl, but excluding the hydroxy and alkoxy endgroups) and is in the range of from 0.006 to 0.02. The average degree of polymerization is x+y and is greater than about 50 and preferably greater than 80, typically greater than 100. The average number of endgroups E+E' is 2 or less relative to x+y.

PTT made by prior art processes with dimethyl terephthalate (DMT), such as described in Japanese published patent application 51-142097 or U.S. Pat. No. 5,340,909, is inherently oxidatively stable (as shown in the comparative examples below) and does not form very much acrolein because the milder, less acidic DMT process reaction conditions form very little DPG (as shown in the examples below, 0.55 mole percent or less) but the polymer made this way is difficult to process. These DMT polymers are not as dyeable as the polymers of the present invention.

Current commercial processes for making PTT using TPA by polycondensation and solid state polymerization produce PTT, hereinafter referred to a "TPA PTT," with higher levels of DPG (thus exhibiting an increased capacity to produce acrolein in downstream processing), i.e., generally in the range of 2 to 4 mole percent. These polymers are not as dyeable as the polymers of the present invention.

BRIEF SUMMARY OF THE INVENTION

According to the invention, a polytrimethylene terephthalate is provided having less than about 2 mole percent based on diol units, preferably 0.6 to 1.9 mole percent, more preferably 1.0 to 1.8 mole percent, dipropylene glycol monomer units copolymerized into the polymer. Total diol units also includes endgroups such as allyl, PDO, and DPG. Such compositions have a reduced tendency to generate acrolein when heated in air. These PTT polymer compositions exhibit improved and enhanced dyeability as compared to PTT made by the DMT processes and the TPA polycondensation/solid state polymerization processes.

DETAILED DESCRIPTION OF THE INVENTION

The invention compositions are prepared by the reaction of a molar excess of 1,3-propanediol (PDO) and terephthalic acid (TPA) by esterification followed by polycondensation, with the important proviso that the reaction conditions include maintenance of relatively low concentration of PDO and TPA in the melt reaction mixture. The condensation polymerization of polytrimethylene terephthalate can generate as much as about 2 to 4 mole percent of dipropylene glycol which, in effect, becomes a comonomer and is incorporated into the polyester chain. The all-melt process by which the PTT of this invention can be made dramatically decreases the amount of DPG generated (and hence also decreases the tendency for generation of acrolein during polymer processing) while maintaining a desired (for dyeability) minimum amount of DPG of 0.6 to less than 2.0, preferably 0.6 to 1.9, most preferably 1.0 to 1.8, mole percent based on total diol units. This PTT is referred to as "all-melt PTT." One could adjust the DPG level by adding DPG monomer to the polymerization mixture or by treating the PDO with acid before polymerization (as shown in the examples).

As used herein, "1,3-propanediol-based aromatic polyester" refers to a polyester prepared by the condensation polymerization reaction of one or more diols with one or more aromatic diacids or alkyl esters thereof (herein referred to collectively as "diacid") in which at least 80 mole percent of the diol(s) is 1,3-propanediol. "Polytrimethylene terephthalate" refers to such a polyester in which at least about 80 mole percent of the diacid(s) is terephthalic acid. Other diols which may be copolymerized in such a polyester include, for example, ethylene glycol, diethylene glycol, 1,4-cyclohexane dimethanol, and 1,4-butanediol; and other aromatic and aliphatic acids which may be copolymerized include, for example, isophthalic acid and 2,6-naphthalane dicarboxylic acid.

The preparation of the invention composition can be conveniently described by reference to an esterification step, a prepolymerization step, and a polycondensation step. The process can be carried out in batch or continuous mode. Each step can be carried out in multiple stages in a series of reaction vessels if desired for optimum efficiency in the continuous mode or for product quality. Each step is preferably carried out in the absence of oxygen. The following will describe the process in terms of the preferred continuous mode.

In the process, which will be described below in terms of the reaction of terephthalic acid and 1,3-propanediol to prepare polytrimethylene terephthalate, careful regulation of conditions in the esterification step is critical to the production of a high intrinsic viscosity (IV) PTT without the necessity of a solid state polymerization step. The important conditions are believed to be the instantaneous concentration of 1,3-propanediol monomer (and TPA monomer) in the reaction mass, which is affected by the reaction pressure, reaction temperature, and monomer addition rate. These conditions are controlled so as to minimize the production of dipropylene glycol and maximize the IV.

In the esterification step, the instantaneous concentration of unreacted 1,3-propanediol in the reaction mass is maintained relatively low. This is accomplished by regulation of pressure and monomer feed. 1,3-propanediol and terephthalic acid are fed to a reaction vessel in a total feed molar ratio within the range of 1.15:1 to 2.5:1. Selection of the diol:diacid ratio within this preferred relatively narrow range is a factor in achieving the desired product quality. In batch reactions, this is difficult to calculate. It is controlled by the paste feed molar ratio which is generally lower, i.e., about 1.15:1 to 1.4:1. It is also preferred to add the 1,3-propanediol and terephthalic acid gradually so as to allow time to allow the conversion to ester to take place and keep the PDO and TPA concentrations low.

Also, to maintain the desired instantaneous concentration of 1,3-propanediol a relatively low reaction pressure should be maintained in the esterification step. Conventional polytrimethylene terephthalate processes employ pressures greater than atmospheric to promote reaction between the monomers and to eliminate the need for an esterification catalyst. To make the invention composition, the esterification reaction pressure is maintained below about 3 bar absolute, generally within the range of about 0.7 to about 1.5 bar. Because 1,3-propanediol boils at about 214° C. at atmospheric pressure and the esterification reaction is conducted at 240° C. and above, the esterification conditions permit efficient removal of excess or unreacted 1,3-propanediol from the reaction medium, which in turn is believed to reduce dimerization of 1,3-propanediol to dipropylene glycol and/or reaction of 1,3-propanediol with propanediol endgroups of the oligomer to form dipropylene glycol. Unfortunately, high temperatures also favor formation of dipropylene glycol. The temperature of the esterification step will therefore be maintained as low as reasonably possible, generally within the range of 240 to 270° C. The time of the esterification step will typically range from about 1 to about 4 hours. Water is produced as a by-product of esterification and is removed by suitable means such as overhead distillation.

The presence of strong acid also promotes formation of dipropylene glycol. Therefore, conditions which suppress the instantaneous concentration of strong acid, such as dissolved terephthalic acid, are desirable. Such conditions include gradual addition of terephthalic acid and PDO feed, and the use of an esterification catalyst.

An esterification catalyst is optional but preferred in an amount of about 5 ppm to about 100 ppm (metal), preferably about 5 ppm to about 50 ppm, based on the weight of final polymer. Because of the desirable lower temperatures under which the esterification is carried out, the esterification catalyst will be of relatively high activity and resistant to deactivation by the water byproduct of this step. The currently preferred catalysts for the esterification step are titanium and zirconium compounds, including titanium alkoxides and derivatives thereof, such as tetra(2-ethylhexyl)titanate, tetrastearyl titanate, diisopropoxy-bis (acetylacetonato) titanium, di-n-butoxy-bis (triethanolaminoato)titanium, tributyl monoacetyltitanate triisopropyl monoacetyltitanate and tetrabenzoic acid titanate; titanium complex salts such as alkali titanium oxalates and malonates, potassium hexafluorotitanate and titanium complexes with hydroxycarboxylic acids such as tataric acid, citric acid or lactic acid, catalysts such as titanium dioxide/silicon dioxide coprecipitate and hydrated alkaline-containing titanium dioxide; and the corresponding zirconium compounds. Catalysts of other metals, such as antimony, tin, zinc, and the like can also be used.

The currently preferred catalyst for esterification, prepolymerization, and polycondensation is titanium tetrabutoxide. The catalyst is preferably formulated and added to the monomer feed, prior to or during the esterification, as a dilute liquid solution in 1,3-propanediol. This catalyst feed will preferably contain 5 wt % or less titanium. The presence of an organic acid, such as a $C_{1-8}$ alkyl carboxylic acid such as acetic acid or a $C_{4-12}$ dicarboxylic acid such as isophthalic or terephthalic acid, in the catalyst solution helps prevent agglomeration, catalyst flashoff, and side reactions which can produce undesired insoluble particles.

The esterification step can be carried out in stages in a single or multiple vessels, with catalyst addition in or between any stage as desired to provide a total added metal catalyst within the range of 20 to 250 ppm, preferably 25 to 100 ppm, based on final polymer. For example, a two-stage esterification step would include a first stage carried out at about atmospheric pressure or a little above followed by a second stage at or below atmospheric pressure. The temperature is 240 to 270° C. In such a two-stage esterification process, a liquid catalyst feed could be introduced in each stage. In the first stages, a catalyst feed of 5 to 50 ppm titanium can be introduced as a paste with the monomer feed. The first-stage reaction is continued until about 90 to 95% of the terephthalic acid is consumed. For the second stage, an additional 20 to 150 ppm titanium may be injected, the pressure is maintained in the range of about 0.5 to about 1.2 bar, preferably near atmospheric, and the reaction is continued until consumption of about 97 to 99% of the terephthalic acid. In a continuous process, the stages would be carried out in separate reaction vessels. A 1,3-propanediol slurry of $TiO_2$ will typically be added to the esterification step as desired for making delustered product.

The conditions of the esterification step are selected so as to produce a low molecular weight oligomeric product having an intrinsic viscosity (i.v., as measured in 60:40 phenol:tetrachloroethane at 30° C.) of less than about 0.2, usually within the range of about 0.05 to about 0.15 (corresponding to a degree of polymerization of about 3 to about 10).

In the prepolymerization step, the pressure on the esterification product mixture is reduced to less than 200 mbar, preferably to 2 to 200 mbars, and the temperature is maintained within the range of 250 to 270° C. 1,3-propanediol and byproduct water are removed overhead. The time required for this step will generally be less than about 2 hours. The product will have an intrinsic viscosity within the range of 0.15 to 0.40 dl/g (corresponding to a degree of polymerization of about 10 to about 30). The prepolymerization step, particularly in the continuous mode, is preferably carried out in two vacuum stages, with the initial stage between 50 and 200 mbar and the second stage between 2 and 20 mbar.

For the polycondensation step of this process for making the polymers of this invention, the reaction mixture is maintained under vacuum, preferably within the range of 0.2 to 2.5 mbars, and at a temperature within the range of 250 to 270° C. In general, the polycondensation step will require about 1 to about 6 hours to reach the desired molecular weight, with shorter reaction times preferred to minimize the formation of color bodies.

The polycondensation step is most suitably carried out in a high surface area generation reactor capable of large vapor mass transfer, such as a cage-type, basket, perforated disk, disk ring or twin screw reactor. Optimum results are achievable in the process from the use of a cage type reactor or disk ring reactor, which promote the continuous formation of large film surfaces in the reaction product and facilitate evaporation of excess 1,3-propanediol and polymerization byproducts.

In keeping with the desire to maintain control of the temperature to which the oligomer or polymer is exposed during each stage of the process including polycondensation, the average temperature of the walls of the reaction vessels contacting the melt reaction product are maintained below 300° C., preferably below 290° C., because contact of the polymer with excessively hot vessel walls is a cause of polymer degradation and also promotes formation of dipropylene glycol.

The polycondensation process is carried out in the presence of a polycondensation catalyst, preferably a titanium or zirconium compound as discussed above because of the high activity of these metals. The currently preferred polycondensation catalyst is titanium butoxide, preferably present in an amount within the range of 25 to 100 ppm titanium.

The polymerization process may optionally include addition of stabilizers, coloring agents, and other additives for polymer property modification. Specific additives include delustering agents such as titanium dioxide; coloring agents such as cobalt acetate or organic dyes; stabilizers such as phosphorus compounds and hindered phenols; branching agents such as polyfunctional carboxylic acids, polyfunctional acid anhydrides, polyfunctional alcohols, and carboxyphosphonic acids or esters thereof.

The polymer of the present invention achieves relatively low acrolein levels without the addition of stabilizers. The use of stabilizers may be desirable to achieve even lower acrolein levels. This can be achieved at lower levels of stabilizer than those described in copending commonly assigned U.S. patent application Modified Polytrimethylene Terephthalate, Ser. No. 09/756,595, filed Dec. 7, 1998, which is herein incorporated by reference, which describes stabilized high DPG content PTT wherein some of the polymer chains have at least one terminal group of the formula

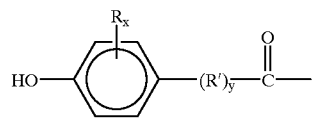

in which R is a $C_{1-12}$ alkyl group including methyl, ethyl, isopropyl, t-butyl, t-amyl, 2-phenyl-2-propyl and the like; x is an integer from 1 to 4; at least one R group is ortho to the phenolic hydroxyl group; R' is —($CH_2$)— or alkyl-substituted methylene; and y is an integer from 1 to about 20.

It is advantageous if lower concentrations of stabilizer additives are required to prevent acrolein formation for the invention compositions than for conventional polytrimethylene terephthalate because hindered phenols can cause formation of color when the polymer is exposed to air. Thus, using less hindered phenol can result in improved color.

Such hindered phenol stabilizers will generally be added to the polymerization in an amount within the range of 0.0005 to 1 mmol per mole of diacid(s), preferably 0.001 to 0.1 mmole/mole of diacid(s).

Following polycondensation in the melt, the product can be fed directly to melt spinning or alternately can be solidified, granulated, and crystallized. The granulate can be further processed as desired. Thermal treatment of the solid polymer may be used, for example, for devolatilization of low molecular weight byproducts and water.

The invention 1,3-propanediol-based aromatic polyester prepared by the invention process has an intrinsic viscosity (IV) of at least 0.6, preferably 0.7 or greater, most preferably 0.8 or greater, and for some applications, preferably within the range of about 0.9 to about 1.3, as measured in a solution of 0.4 g polymer in 100 ml of a 60:40 solution of phenol:tetrachloroethane at 30° C. (or as a dilute solution in another solvent such as hexafluoroisopropanol, and converted by known correlation to the corresponding IV in 60:40 phenol:tetrachloroethane).

The polymer has a dipropylene glycol unit content less than about 2.0 mole %, preferably 0.6 to 1.9, most preferably 1.0 to 1.8, mole %, based on total moles of diol units in the polymer, including allyl and diol endgroups. DPG content in the polymer was measured by proton NMR (nuclear magnetic resonance) on polymer dissolved in a 50/50 by volume mixture of deuterated trifluoroacetic acid and chloroform; the methylene next to the ether oxygen of the DPG units has a characteristic triplet resonance of 3.9 ppm. The absolute mole percent of DPG units in the polymer was determined using the integrated value of the 3.9 ppm resonance compared to the integrated NMR signals for the PDO and allyl units. The estimated precision was +/−0.04 mole % (absolute). By virtue of this low dipropylene glycol content, the invention polytri-methylene terephthalate has a significantly improved stability when heated in air. It also exhibits enhanced dyeability as demonstrated in the following examples.

EXAMPLES

The following experiments were undertaken to prepare PTT using DMT according to literature conditions having very low DPG content. We then compared the dyeability of these DMT PTT polymers to the all-melt PTT and to the conventionally produced TPA PTT. We also compared the acrolein formation in aging experiments.

The results show that the all-melt PTT composition with about 0.6 up to about 2 mole % DPG units is an optimum composition range with better dyeing than the DMT-based products and, surprisingly, equal to or better than the TPA PTT product having higher DPG. The results also show that acrolein formation from the all-melt composition is less than from the TPA PTT composition with higher DPG content, but the DMT-based products with very low DPG content show even less acrolein Therefore, the structure of the all-melt PTT is an overall or global optimum composition, having less acrolein formation than the higher DPG compositions but still retaining very good dyeability, which is compromised by the very low DPG compositions made from DMT.

Examples 1–3 were prepared essentially as follows: in the course of several batch polymerizations, a paste consisting of about 99 kg PDO, 180 kg TPA (molar paste feed ratio about 1.3), toner (in Example 2 - 15.2 gm cobalt acetate; 20 ppm Co based on TPA; as 2% solution in PDO), 0.09 gm antifoam agent (0.5 ppm based on polymer), and 19.8 gm titanium butoxide catalyst (15 ppm Ti based on TPA; added as 2% solution in PDO/TPA or 7.3% solution in PDO/acetic acid) was added gradually over a period of about 2 hours to about 76 kg of stirred PTT oligomer ("heel") that had been prepared essentially in the same manner as described herein. The temperature of the oligomer heel was about 265° C. at the beginning of the paste addition and about 253° C. at the end of the paste feed. The reaction pressure was about 2 bar (absolute) and about 50 minutes after the end of the paste feeding, the pressure was reduced step-wise to about 1.8 bar over about 5 minutes, then to about 1.4 bar over about 5 minutes, and then to about atmospheric pressure (1.0 bar) over about 5 minutes. After an additional esterification time of about 1.3 to 1.5 hours after the end of the paste feeding, after which the temperature was about 258 to 260° C., 85.7 gm titanium butoxide catalyst (65 ppm Ti; as solution in PDO/TPA or PDO/acetic acid) was added.

After this esterification step, a prepolymerization step was conducted in which the pressure of the reactor was lowered from about atmospheric to about 50 to 65 mbar and the reaction temperature was about 255 to 257° C. over about 30 minutes.

After the prepolymerization step, the oligomer was transferred to a disk-ring, high surface area reactor for polycondensation. The pressure in this reactor was ramped down from about 300 mbar to a final pressure of less than 1 mbar over about 45 to 60 minutes. The reaction temperature was about 251 to 263° C. After about 3 hours, the polymer had reached the desired molecular weight and was discharged and pelletized to yield about 210 to 230 kg product.

For Examples 1 and 3, the Co toner was replaced by blue (1 ppm based on polymer) and red (0.3 ppm) toners (Estafil), respectively. For Examples 2 and 3, 14.4 gm of hindered phenol stabilizer, methyl 3-(3,5-di-t-butyl-4-hydroxyphenyl)propionate (as 10% suspension in PDO; about 64 ppm based on final polymer or about 0.22 mmol/Kg), was added to the paste feed.

In Example 4, PTT was prepared similar to Examples 1–3 using a paste feed of about 99 kg PDO, 180 kg TPA, 144 gm of 10% suspension of the hindered phenol stabilizer used in Example 2 (14.4 gm; about 64 ppm based on final polymer), 64.6 gm titanium butoxide catalyst (50 ppm based on TPA), and 20 ppm Co (based on TPA) as cobalt acetate toner added over about 2 hours to the stirred PTT oligomer heel. The temperature of the heel was about 281° C. at the beginning of the paste addition, 266° C. after 30 minutes, and 245° C. at the end of the paste feed. The reaction pressure was essentially atmospheric pressure. After an additional esterification time of about 30 minutes, after which the temperature was 254° C., 133.9 gm phosphoric acid (25 ppm based on TPA) was added to react with the cobalt toner and then 32.3 gm titanium butoxide catalyst (25 ppm Ti based on TPA) was added.

In the prepolymerization step, the pressure was lowered from about atmospheric to about 40 mbar and the reaction temperature was about 256° C. over about 30 minutes. The polycondensation was conducted at about 255 to 266° C. to produce the desired molecular weight and the product was discharged and pelletized to yield about 225 kg.

Endgroup analyses showed about 10 to 11 mequiv/Kg carboxyl (COOH) endgroups for Examples 1–3 and typically about 9 to 17 mequiv/Kg in similar polymerizations. Allyl endgroups were about 0.3 mole. Endgroup analyses showed carboxyl (COOH) endgroups were in the range of about 8 to 16 mequiv/Kg for Comparative Examples T and H. Allyl endgroups were in the range of about 0.2 to 0.4 mole %. Since these are very similar, endgroup content can be dismissed as a reason for differences in dyeability and spinnability between the PTT of this invention and the prior art DMT PTT.

The following table summarizes the Examples and Comparative Examples in this study:

TABLE 1

| Example | Lot # | Stabilizer | IV (R-100) | DPG, mol % (NMR) | |
|---|---|---|---|---|---|
| 1 | P1242-5 | no | 0.89 | 1.6 | |
| 2 | P1214-14 | yes | 0.90 | 1.70 | |
| 3 | P1214-39/40 | yes | 0.92 | 1.30 | See discussion |
| A | 10ZPB002 | yes | 0.92 | 2.4 | SSP product |
| B | 4-3B1-44-1 | no | 0.92 | 3.0 | SSP product |
| T-1 | P1240-10 | no | 0.92 | 0.51 | |
| T-2 | P1240-11 | yes | 0.91 | 0.48 | |
| T-3 | P1240-14 | no | 1.08 | 0.55 | High IV |
| H-1 | P1240-15 | no | 0.91 | 0.50 | |
| H-2 | P1240-16 | yes | 0.91 | 0.21 | |
| H-3 | P1240-12 | no | 0.91 | 0.22 | 50 ppm Ti |
| H-4 | P1240-13A | yes | 0.91 | 0.35 | 50 ppm Ti |
| H-5 | P1240-13 | yes | 0.92 | 0.11 | 50 ppm Ti; lower temp |

Examples 1 and 2 are the compositions of the Invention. Example 1 was prepared using a small amount of blue (1 ppm) and red (0.3 ppm) toners to reduce the 20 initial color (b*) of the polymer and also was made without hindered phenol stabilizer. Example 2 was prepared with 20 ppm Co acetate toner instead of blue/red toner and contained 80 ppm (based on TPA) of hindered phenol stabilizer (methyl 3-(3, 5-di-t-butyl-4-hydroxyphenyl)propionate), which is about 64 ppm stabilizer based on final polymer (about 0.22 mmol/Kg).

Example 3 contained blue/red toners as in Example 1 and hindered phenol stabilizer as in Example 2. Example 3 is included in the data here for completeness but considerable evidence suggests that this was an abnormal sample, particularly with regard to spinning and dyeing. This sample had been in storage for over a year. Tenacity data for this polymer suggests that it spun abnormally. Unlike the other examples, spinning of this material was difficult and only about 3 minute (or less) bobbins could be made because of breaks in the fibers. An extrusion film test of this material showed over 15,000 defects compared to generally <7,000 defects for normal polymer samples, indicating contamination by a small amount of nylon, as determined by infrared analysis. We believe that the dyeing data for Example 3 is suspect.

Comparative Example A is the composition containing higher DPG content prepared in a small commercial-scale plant under conditions similar to Example C. It contained 0.025% Irganox 1076 (octadecyl 3-(3,5-di-t-butyl-4-hydroxyphenyl)propionate) which is equivalent to about 138 ppm of the stabilizer used in Example 2 (or about 0.47 millimole/Kg). Note the higher level of stabilizer compared to the other Examples. Allyl groups were about 0.3 mole %.

Comparative Example B is a solid stated sample made in a benchscale reactor without any hindered phenol stabilizer. This sample was used in the aging studies only and was not spun or dyed.

Comparative Example C is a typical preparation of high DPG PTT. An oil-heated stainless steel reactor was charged with about 11.5 lbs. (5.2 Kg) of 1,3-propanediol and about 19.3 lbs. (8.8 Kg) of terephthalic acid and heated to about 250 to 260° C. at an oil jacket temperature set point of about 265° C. under 10 to 60 psig nitrogen. The aqueous distillate was removed as the reaction continued over about 4 hours. To the resulting oligomeric product was added about 9.6 lbs (4.4 Kg). PDO and about 16.1 lbs (7.3 Kg). TPA, and the reaction was continued under similar conditions for less than about 3 hours to form an oligomer with an average degree of polymerization of about 4 to 8.

Approximately half of the oligomer was transferred to a second reactor. For subsequent batches, PDO (9.6 lbs.; 4.4 Kg) and terephthalic acid (16.1 lbs.; 7.3 Kg) were added rapidly to the oligomer remaining in the first reactor and the oligomerization under pressure was repeated. Titanium butoxide [Ti(OBu)$_4$] was added as a solution in PDO/HOAc to the second reactor, the reaction mixture was heated at about 231 to 235° C. at an oil jacket temperature set point of about 250° C., the pressure was reduced to less than 2 mm Hg, and the excess PDO was distilled off over about 1 to 2 hours at full vacuum and about 240 to 250° C. (oil about 260° C.) until the desired molecular weight was achieved (i.v.=0.65 to 0.70). The molten polymer (about 20 lbs. product) was discharged from the reactor as strands, cooled, and pelletized. The polymers were advanced to higher molecular weight (i.v.=0.90 to 0.94) by solid state polymerization by heating at about 210 to 220° C. under vacuum for about 4 to 5 hours or more. The final polymer in this example contained about 3.7 moles DPG (by proton NMR).

Examples T-1, T-2 and T-3 were made in the same reactor as Examples 1 and 2 using dimethyl terephthalate (DMT) using conditions as close as practical to those described in Japanese patent application 51-142097, filed Dec. 7, 1976, using about 2.2 molar feed ratio of PDO/DMT, and 100 ppm Ti catalyst (720 ppm titanium tetrabutoxide added as solution in PDO/acetic acid). The blue/red toners were also used, as in Example 1. Thus, for Examples T-1 and T-2, the first reactor was charged with about 164 liters of 1,3-propanediol and the catalyst and heated to about 160° C. Melted dimethyl terephthalate (DMT; about 200 Kg) was added to the stirred mixture over about 90 minutes while heating the mixture to about 177° C. The esterification reaction was continued for about 2 more hours while the temperature was increased to about 217 to 222° C. and methanol was distilled overhead. Vacuum was applied to reduce the pressure to about 60 to 70 mbar over about 1 hour and the reaction temperature at the end of this period was about 242 to 249° C. The reactor contents were transferred to the high surface area reactor and heated at about 244 to 255° C. melt temperature (oil set point 245° C.) under vacuum (<1 mbar at the end of the polycondensation) for about 4 to 4.5 hours to provide polymer with the desired IV of about 0.92 for spinning. The polycondensation time for T-3 was about 5.5 hours and because the IV was so high, this sample was not spun. The hindered phenol stabilizer (17 gm; about 80 ppm based on final polymer) was added to T-2 and T-3 as in Example 2.

Examples H-1 and H-2 were made in the same reactor using PDQ/DMT feed ratio of about 1.4 under conditions as close as practical to those described in U.S. Pat. No. 5,340,909 using 14 ppm Ti catalyst (100 ppm titanium tetrabutoxide added as a solution in PDQ/acetic acid) for the esterification step, and 450 ppm butylstannoic acid (Fascat 4100) for the polycondensation step. The catalyst amounts are based on DMT. Blue/red toners were used for all the "H" examples. Example H-2 used hindered phenol stabilizer as in Example T-2. Thus, the first reactor was charged with about 105 liters of 1,3-propanediol and the Ti catalyst and heated to about 180 to 184° C. Molten DMT (about 200 Kg) was added to the stirred reactor over about 90 minutes and the esterification reaction was continued for an additional time of about 2.5 to 3 hours while increasing the temperature to about 225° C. and distilling methanol overhead. The pressure was reduced to about 50 to 60 mbar over about 1 hour at a reaction temperature starting about 228 to 237° C. and raised to about 250 to 253° C. The tin catalyst was added to the oligomeric product and the reactor contents transferred to the high surface area reactor. Polycondensation was conducted at about 241 to 253° C. (final pressure of <1 mbar) for a total of about 3 hours to reach the desired IV of about 0.92 for spinning. The polycondensation times were determined by the time needed to achieve 0.92 IV product rather than the times given in the patent.

Examples H-3 and H-4 were run under modified conditions similar to H-1 and H-2 but using 50 ppm Ti catalyst instead of 14 ppm in the esterification step. The reaction temperatures and times were about 182 to 236° C. over 3.3 to 4.5 hours (including DMT feed) for the esterification, about 237 to 244° C. and about 30 minutes for the vacuum pulldown, and about 236 to 250° C. (oil set point 245° C.) and about 2.7 to 3 hours for polycondensation to reach about 0.92 IV. Example H-5 was conducted similar to H-3 and H-4 but using a lower temperature in the esterification step (181 to 187° C. for about 2.3 hours. The temperature was then raised to about 220° C. during the vacuum pulldown and polycondensation was conducted at about 245 to 250° C. for about 2.3 hours.

Spinning

The dried polymer chips were extruded and spun to make 80 and 150 denier partially oriented yarns (POY) using a 50-hole, 0.25/0.50 mm spinnerette and 245 to 255° C. extruder zone temperatures, 1500 to 1700 psi outlet pressure, 2.4 cc/rev melt pump at about 12 rpm and 23 rpm (for 80 and 150 denier, respectively), top and bottom godets at 4570 to 4580 m/min, type SW4 winder at 4500 m/min, interlacer at 4 bar and 60 psi, quench temperature 15° C., and Lurol PT 7087 spin finish. Generally, 10 and 30 minute bobbins were prepared at each denier.

Samples of the POYs were drawn using 9 wraps at 280 m/min on the first godet heated at 50° C., 14 wraps at 400 m/min on the second godet heated at 100° C., and a 400 m/min winder.

Dyeing Procedure

The dyes were C.I. Disperse Blue 56 and 79. Disperse Blue 56 is a low energy dye with a small anthraquinone structure and a molecular weight of 305 g/mole. Disperse Blue 79 is a high energy monoazo dye with larger molecular size than Disperse Blue 56 and a molecular weight of 639 g/mole. The POY samples were dyed in one set of experiments and the drawn yarns were dyed separately in another set of experiments.

Yarns from each example were single knit to form fabrics using a Lawson-Hemphill Model FAK sample knitting machine. All fabrics (POY or drawn) from different examples with the same denier were dyed together. The competitive dyeing was performed with 0.5% owf (on weight of fabric) of either Disperse Blue 56 or Blue 79 at 20:1 liquor ratio using an AATCC Standard Atlas Launder-Ometer. Dyebath temperature was raised at 2° C./min from ambient to 100° C. and held for 45 minutes. The dyed fabrics were water rinsed and air dried.

After dyeing, the dye uptake was evaluated and compared by their K/S values at the wavelength with maximum absorbance, which is broadly used as a description of shade depth and is directly proportional to dye concentration on the fiber if the shade depth is not too high. Color differences between the yarns were measured by their CIELab values.

To describe the differences of K/S and CIELab values among the yarns, %K/S and Delta E values were calculated using the yarn with the highest shade depth, i.e., Example 1 for both deniers, as the standard. Color measurement used a BYK Gardner Model TCS spectrophotometer. Generally, a Delta E larger than 0.5 or a %K/S difference larger than 5S indicated a visual color difference.

Comparing the K/S values between yarns with different denier, 150 denier was dyed darker than 80 denier, probably due to the larger diameter of the fiber and yarn of the 150 denier materials.

Delta E ($\Delta E$) is the overall color difference (see T. L Vigo, "Textile Processing and Properties," Elsevier, 1994, p. 330–331) between Example 1 and the compared sample and is calculated as $[(L^*s-L^*r)^2+(a^*s-a^*r)^2+(b^*s-b^*r)^2]^{1/2}$, where $L^*$, $a^*$ and $b^*$ are the measured Cielab color values and s and r are the sample and the reference (Example 1), respectively. The larger the value of $\Delta E$, the larger the difference in color compared to the reference sample, viz. higher $\Delta E$ values indicate less dye uptake than Example 1.

K/S or "shade depth" is a measure of the opacity and reflectance (see Vigo) and is defined as $(1-R)^2/2R$, where R is the reflectance and S is the scattering coefficient. For Blue 56, the reflectance measurement was made at 630 nm and for Blue 79 the measurement was made at 610 nm. %K/S is the relative magnitude compared to the reference sample (Example 1).

TABLE 2

80 Denier With Blue 56

| Example | Denier | L* | a* | b* | Delta E | K/S 630 nm | % K/S | Process | % DPG |
|---|---|---|---|---|---|---|---|---|---|
| 1 | 82 | 48.34 | −6.95 | −32.65 | 0.00 | 5.815 | 100% | TPA melt | 1.64 |
| 2 | 77 | 47.88 | −6.76 | −32.69 | 0.50 | 5.961 | 103% | TPA melt | 1.7 |
| A | 78 | 48 | −6.85 | −33.7 | 1.11 | 6.157 | 106% | TPA SSP | 2.4 |
| T-1 | 78 | 49.43 | −9.45 | −28.64 | 4.85 | 5.264 | 91% | DMT | 0.51 |
| T-2 | 82 | 48.93 | −9.72 | −28.63 | 4.92 | 5.511 | 95% | DMT | 0.48 |
| H-1 | 82 | 50.61 | −5.87 | −34.61 | 3.19 | 5.013 | 86% | DMT | 0.5 |
| H-2 | 80 | 50.8 | −5.59 | −34.87 | 3.58 | 4.934 | 85% | DMT | 0.21 |
| H-3 | 82 | 48.9 | −6.11 | −34.31 | 1.94 | 5.71 | 98% | DMT | 0.22 |
| H-4 | 82 | 52.05 | −7.04 | −32.7 | 3.71 | 4.457 | 77% | DMT | 0.35 |
| H-5 | 82 | 51.92 | −7.14 | −32.51 | 3.59 | 4.487 | 77% | DMT | 0.11 |

Table 2 shows the dyeing results for 80 denier drawn yarns with Blue 56 dye. Example 1 and 2 were the darkest ($\Delta E$ 0.0 and 0.5, respectively). Based on $\Delta E$, all the other fibers, including Example A, did not dye as well. Based on %K/S, Examples 1,2 and A were similar and all the DMT-based polymers were lighter, although H-3 was almost as high as Ex. 1.

Table 3 shows similar results for Blue 79 dye. Again, Example 1 is darkest overall ($\Delta E=0.0$) compared to the others, including Example 2 and A. In terms of %K/S, Example 1 and 2 are the best, Example A is next best, and all the other samples are not as good.

TABLE 3

80 Denier With Blue 79

| Example | Denier | L* | a* | b* | Delta E | K/S 610 nm | % K/S | Process | % DPG |
|---|---|---|---|---|---|---|---|---|---|
| 1 | 82 | 42.16 | −5.56 | −23.71 | 0.00 | 5.997 | 100 | TPA melt | 1.64 |
| 2 | 77 | 44.83 | −6.42 | −23.69 | 2.81 | 5.132 | 85.6 | TPA melt | 1.7 |

TABLE 3-continued

80 Denier With Blue 79

| Example | Denier | L* | a* | b* | Delta E | K/S 610 nm | % K/S | Process | % DPG |
|---|---|---|---|---|---|---|---|---|---|
| A | 78 | 46.13 | −6.56 | −24.13 | 4.12 | 4.741 | 79.1 | TPA SSP | 2.4 |
| T-1 | 78 | 45.19 | −6.42 | −23.3 | 3.18 | 4.944 | 82.4 | DMT | 0.51 |
| T-2 | 82 | 47.26 | −6.58 | −23.1 | 5.24 | 4.261 | 71.1 | DMT | 0.48 |
| H-1 | 82 | 46.63 | −6.38 | −23.05 | 4.59 | 4.417 | 73.7 | DMT | 0.5 |
| H-2 | 80 | 47.1 | −6.41 | −22.89 | 5.08 | 4.256 | 71 | DMT | 0.21 |
| H-3 | 82 | 47.04 | −6.32 | −23.12 | 4.97 | 4.28 | 71.4 | DMT | 0.22 |
| H-4 | 82 | 47.78 | −6.53 | −23.17 | 5.73 | 4.112 | 68.6 | DMT | 0.35 |
| H-5 | 82 | 47.87 | −6.5 | −23.05 | 5.82 | 4.07 | 67.9 | DMT | 0.11 |

The results at 150 denier appear to be generally similar although somewhat less definitive results in that occasionally a DMT-based sample gives %K/S similar to or higher than Example 1. However, Example 1 is still the darkest based on ΔE. See Tables 4 and 5.

DPG, represent optimum compositions in terms of dyeability.

Results on POY Yarns

Tables 6 to 9 show the data for POY (partially oriented yarn) samples. Overall, the results are similar to the drawn

TABLE 4

150 Denier With Blue 56

| Example | Denier | L* | a* | b* | Delta E | K/S 630 nm | % K/S | Process | % DPG |
|---|---|---|---|---|---|---|---|---|---|
| 1 | 152 | 42.6 | −5.49 | −33.54 | 0.00 | 8.889 | 100% | TPA melt | 1.64 |
| 2 | 140 | 42.58 | −5.61 | −33.61 | 0.14 | 8.96 | 100.8% | TPA melt | 1.7 |
| 3 | 150 | 42.96 | −6.05 | −32.79 | 1.00 | 8.614 | 96.9% | TPA melt | 1.3 |
| A | 152 | 43.58 | −5.4 | −34.52 | 1.39 | 8.491 | 95.5% | TPA SSP | 2.4 |
| T-1 | 152 | 41.72 | −8.01 | −29.75 | 4.64 | 9.31 | 104.7% | DMT | 0.51 |
| T-2 | 152 | 42.73 | −8.07 | −29.7 | 4.63 | 8.58 | 96.5% | DMT | 0.48 |
| H-1 | 151 | 43.84 | −3.74 | −35.88 | 3.17 | 8.117 | 91.3% | DMT | 0.5 |
| H-2 | 152 | 44.53 | −3.67 | −35.89 | 3.54 | 7.656 | 86.1% | DMT | 0.21 |
| H-3 | 153 | 43.48 | −4.41 | −34.82 | 1.89 | 8.268 | 93.0% | DMT | 0.22 |
| H-4 | 152 | 44.33 | −4.67 | −35.01 | 2.41 | 7.865 | 88.5% | DMT | 0.35 |
| H-5 | 152 | 44.3 | −4.69 | −34.6 | 2.16 | 7.764 | 87.3% | DMT | 0.11 |

TABLE 5

150 Denier With Blue 79

| Example | Denier | L* | a* | /b* | Delta E | K/S 610 nm | % K/S | Process | DPG |
|---|---|---|---|---|---|---|---|---|---|
| 1 | 152 | 40.97 | −5.54 | −24.54 | 0.00 | 6.751 | 100 | TPA melt | 1.64 |
| 2 | 140 | 41.2 | −5.52 | −24.84 | 0.38 | 6.686 | 99 | TPA melt | 1.7 |
| 3 | 150 | 42.89 | −5.8 | −24.7 | 1.94 | 5.93 | 87.8 | TPA melt | 1.3 |
| A | 152 | 43.38 | −5.74 | −25.43 | 2.58 | 5.812 | 86.1 | TPA SSP | 2.4 |
| T-1 | 152 | 40.17 | −5.37 | −24.93 | 0.91 | 7.214 | 106.9 | DMT | 0.51 |
| T-2 | 152 | 40.97 | −5.52 | −24.75 | 0.21 | 6.785 | 100.5 | DMT | 0.48 |
| H-1 | 151 | 43.26 | −5.76 | −24.34 | 2.31 | 5.697 | 84.4 | DMT | 0.5 |
| H-2 | 152 | 43.46 | −5.76 | −24.22 | 2.52 | 5.59 | 82.8 | DMT | 0.21 |
| H-3 | 153 | 42.35 | −5.63 | −23.92 | 1.52 | 5.996 | 88.8 | DMT | 0.22 |
| H-4 | 152 | 43.31 | −5.75 | −24.25 | 2.37 | 5.648 | 83.7 | DMT | 0.35 |
| H-5 | 152 | 43.89 | −5.76 | −24.15 | 2.95 | 5.406 | 80.1 | DMT | 0.11 |

Generally, the data shows that not only does the composition of the Invention (Examples 1 and 2) dye better than the DMT-based polymers with low DPG content, but also the Invention composition dyes better than the TPA-based polymer with higher DPG content. Thus, the Invention compositions with about 0.6 to about 1.9 mole % samples. In every case, Example 1 has the lowest ΔE and generally the highest O K/S compared to the DMT-based polymers and compared to the current SSP product. Note that data for Example 3 is included, although we believe this is not representative of the properties of the polymer of the invention for reasons previously stated.

TABLE 6

80 Denier POY With Blue 56

| Example | L* | a* | b* | Delta E | K/S 630 nm | % K/S | Process | % DPG |
|---|---|---|---|---|---|---|---|---|
| 1 | 42.04 | −5.03 | −34.33 | 0.00 | 9.486 | 100 | TPA melt | 1.64 |
| 3 | 44.04 | −3.44 | −37.13 | 3.79 | 8.373 | 88.3 | TPA melt | 1.3 |
| A | 43.55 | −5.83 | −33.79 | 1.79 | 8.511 | 89.7 | TPA SSP | 2.4 |
| T-1 | 44.04 | −3.4 | −37.01 | 3.72 | 8.339 | 87.9 | DMT | 0.51 |
| T-2 | 44.46 | −8.13 | −30.61 | 5.41 | 7.75 | 81.7 | DMT | 0.48 |
| H-1 | 45.3 | −4.69 | −35.75 | 3.57 | 7.56 | 79.7 | DMT | 0.5 |
| H-2 | 44.55 | −4.49 | −36.09 | 3.11 | 8.078 | 85.2 | DMT | 0.21 |
| H-3 | 42.99 | −5.46 | −35.17 | 1.34 | 9.293 | 98 | DMT | 0.22 |
| H-4 | 44.83 | −4.71 | −35.48 | 3.03 | 7.764 | 81.8 | DMT | 0.35 |
| H-5 | 44.34 | −8.25 | −30.51 | 5.50 | 7.861 | 82.9 | DMT | 0.11 |

TABLE 7

80 Denier POY With Blue 79

| Example | L* | a* | b* | Delta E | K/S 610 nm | % K/S | Process | % DPG |
|---|---|---|---|---|---|---|---|---|
| 1 | 41.24 | −6.17 | −24.11 | 0.00 | 6.759 | 100 | TPA melt | 1.64 |
| 3 | 42.78 | −5.73 | −23.95 | 1.61 | 5.876 | 87 | TPA melt | 1.3 |
| A | 43.16 | −6.39 | −24.79 | 2.05 | 6.015 | 89 | TPA SSP | 2.4 |
| T-1 | 43.92 | −5.71 | −23.09 | 2.90 | 5.286 | 78.2 | DMT | 0.51 |
| T-2 | 42.31 | −6.41 | −24.6 | 1.20 | 6.377 | 94.3 | DMT | 0.48 |
| H-1 | 44.02 | −5.57 | −23.36 | 2.94 | 5.259 | 77.8 | DMT | 0.5 |
| H-2 | 43.39 | −5.6 | −23.62 | 2.28 | 5.545 | 82 | DMT | 0.21 |
| H-3 | 42.84 | −6.42 | −25.14 | 1.92 | 6.242 | 92.4 | DMT | 0.22 |
| H-4 | 44 | −5.84 | −23.67 | 2.81 | 5.349 | 79.1 | DMT | 0.35 |
| H-5 | 42.57 | −6.41 | −24.5 | 1.41 | 6.233 | 92.2 | DMT | 0.11 |

TABLE 8

150 Denier POY With Blue 79

| Example | L* | a* | b* | Delta E | K/S 630 nm | % K/S | Process | % DPG |
|---|---|---|---|---|---|---|---|---|
| 1 | 38.75 | −3.64 | −35.11 | 0.00 | 12.085 | 100% | TPA melt | 1.64 |
| 3 | 40.88 | −4.88 | −34.22 | 2.62 | 10.224 | 84.6% | TPA melt | 1.3 |
| A | 40.86 | −3.76 | −36.62 | 2.60 | 10.798 | 89.4% | TPA SSP | 2.4 |
| T-1 | 41.33 | −7.29 | −31.25 | 5.91 | 9.822 | 81.3% | DMT | 0.51 |
| T-2 | 39.2 | −6.66 | −31.33 | 4.86 | 11.377 | 94.1% | DMT | 0.48 |
| H-1 | 40.15 | −1.38 | −38.56 | 4.36 | 11.237 | 93.0% | DMT | 0.5 |
| H-2 | 43.04 | −2.59 | −38.11 | 5.34 | 9.122 | 75.5% | DMT | 0.21 |
| H-3 | 41.31 | −3.08 | −36.73 | 3.08 | 10.152 | 84.0% | DMT | 0.22 |
| H-4 | 41.91 | −3.09 | −37.13 | 3.79 | 9.784 | 81.0% | DMT | 0.35 |
| H-5 | 43.11 | −3.39 | −37.27 | 4.87 | 9.043 | 74.8% | DMT | 0.11 |

TABLE 9

150 Denier POY With Blue 79

| Example | L* | a* | b* | Delta E | K/S 610 nm | % K/S | Process | % DPG |
|---|---|---|---|---|---|---|---|---|
| 1 | 38.9 | −5.49 | −24.82 | 0.00 | 8.039 | 100.0% | TPA melt | 1.64 |
| 3 | 39.98 | −5.67 | −25.11 | 1.13 | 7.486 | 93.1% | TPA melt | 1.3 |
| A | 42.93 | −5.95 | −26.44 | 4.37 | 6.289 | 78.2% | TPA SSP | 2.4 |
| T-1 | 41.21 | −5.78 | −24.66 | 2.33 | 6.76 | 84.1% | DMT | 0.51 |
| T-2 | 41.94 | −5.88 | −24.9 | 3.07 | 6.459 | 80.3% | DMT | 0.48 |
| H-1 | 41.61 | −5.36 | −24.59 | 2.72 | 6.436 | 80.1% | DMT | 0.5 |
| H-2 | 42.85 | −5.59 | −24.34 | 3.98 | 5.873 | 73.1% | DMT | 0.21 |
| H-3 | 42.4 | −5.5 | −24.24 | 3.55 | 6.037 | 75.1% | DMT | 0.22 |
| H-4 | 39.72 | −5.14 | −24.13 | 1.13 | 7.31 | 90.9% | DMT | 0.35 |
| H-5 | 42.93 | −5.47 | −24 | 4.11 | 5.775 | 71.8% | DMT | 0.11 |

Acrolein Generation—Aging Study

Aging experiments were conducted to determine the stability of the polymer. Four-gram polymer pellets were placed in a forced-air drying oven and the temperature was set at 170° C. (independently checked by pyrometer). The tests were done at 170° C. to accelerate the test. At normal temperatures, the acrolein formation would be much slower. Periodically, a sample was removed after the aging time specified in Table 13 and analyzed. The acrolein was measured by headspace gas chromatography on pellets after heating the sample under air at 200° C. for 40 minutes. Results are reported as ppm based on polymer weight.

Intrinsic viscosity was measured in hexafluoroisopropanol and converted by known correlation to the corresponding values for 60/40 phenol/tetrachloroethane solvent at 30° C. The DPG content was measured by proton NMR (nuclear magnetic resonance) on polymer dissolved in a 50/50 volume mixture of deuterated trifluoroacetic acid and chloroform. The methylene next to the ether oxygen shows a characteristic resonance at 3.9 ppm and is reported as moleo of total PDO plus DPG units and wt % of polymer.

Table 10 shows the results for the samples made without hindered phenol stabilizer. It is clear that the polymers with low DPG content produce less acrolein. The polymer with the highest DPG (Example B) shows the highest acrolein generation early in the aging. The DMT-based polymers with very low DPG show very low acrolein generation even after 27 days, again showing that the acrolein generation is related to DPG level. The polymers of the Invention (Example 1) with moderate DPG level show somewhat higher acrolein formation than the DMT-based polymers.

The compositions of this Invention should thus require less stabilizer to suppress acrolein formation compared to compositions with higher initial DPG content.

TABLE 10

Acrolein Formation (ppm) After Aging at 170° C. (no stabilizer)

| Days | 1 | B | T-1 | H-1 | H-3 |
|---|---|---|---|---|---|
| 1 | 170 | 188 | 17 | 7 | 6 |
| 3 | 192 | 205 | 16 | 27 | 16 |
| 8 | 159 | 150 | 24 | 28 | 19 |
| 12 | 157 | 148 | 25 | 30 | 21 |
| 17 | 113 | 92 | 20 | 28 | 15 |
| 21 | 94 | 65 | 22 | 27 | 16 |
| 27 | 89 | 58 | 20 | 25 | 12 |
| Initial DPG (%) | 1.6 | 3 | 0.51 | 0.5 | 0.22 |

Table 11 shows the change in DPG content as the polymers were aged at 170° C. The decrease in DPG, which is due to oxidation of DPG to acrolein, is highest for the polymers with the highest initial DPG content. Thus, the decrease in DPG for Example B is almost 1% (from 3 to 2%) compared to about 0.66% loss for Example 1.

TABLE 11

Change in DPG (mole %)

| Example | stabilizer | unaged | 1 day | 3 days | 8 days | 12 days | 17 days | 21 days | 27 days | Overall change |
|---|---|---|---|---|---|---|---|---|---|---|
| 1 | no | 1.64 | 1.61 | 1.56 | 1.27 | 1.06 | 0.97 | 0.94 | 0.98 | −0.66 |
| B | no | 3 | 3.2 | 2.92 | 2.52 | 2.14 | 2.48 | 2.28 | 2.03 | −0.97 |
| T-1 | no | 0.51 | 0.46 | 0.54 | 0.52 | 0.44 | 0.44 | 0.43 | 0.48 | −0.03 |
| H-1 | no | 0.5 | 0.42 | 0.52 | 0.5 | 0.43 | 0.41 | 0.42 | 0.39 | −0.11 |
| H-3 | no | 0.22 | 0.22 | 0.24 | 0.25 | 0.19 | 0.25 | 0.19 | 0.19 | −0.03 |

Table 12 shows the change in IV during the aging study. Note that the DMT-based examples show less IV change, even without stabilizer. In some cases, the change is near the potential error of the IV measurements, so the effect of stabilizer at these low DPG levels is very small, at best.

Overall, the results are completely consistent with generation of acrolein by oxidation of DPG units, which results in chain cleavage and lower IV.

TABLE 12

IV Data on Aged Samples

| Example | Stabilizer | Initial IV | IV @ 27 days | Change* |
|---|---|---|---|---|
| 1 | No | 0.89 | 0.63 | 0.26 |
| 3 | Yes | 0.92 | 0.81 | 0.11 |
| A | Yes | 0.92 | 0.81 | 0.11 |
| B | No | 0.92 | 0.74 | 0.18 |
| T-1 | No | 0.92 | 0.87 | 0.05 |
| T-2 | Yes | 0.91 | 0.89 | 0.02 |
| H-1 | No | 0.91 | 0.84 | 0.07 |
| H-2 | Yes | 0.91 | 0.83 | 0.08 |
| H-3 | No | 0.91 | 0.87 | 0.04 |
| H-4 | Yes | 0.91 | 0.86 | 0.05 |
| H-5 | yes | 0.92 | 0.86 | 0.06 |

*Total error can be +/− 0.04 because error for each IV measurement is +/− 0.01.

TABLE 13

Acrolein Generation (ppm) after Aging at 170° C. (with hindered phenol stabilizer)

| Days | Example 2 | Example 4 |
|---|---|---|
| 1 | 13 | 9 |
| 3 | 13 | 8 |
| 8 | 72 | 13 |
| 12 | 242 | 22 |
| 17 | 171 | 28 |
| 21 | 126 | 38 |
| 27 | 102 | 12–30 |
| Initial DPG (%) | 1.7 | 0.6 |

Comparative Example D makes high DPG PTT with added stabilizer. The polymerization of Example C was repeated except that 0.0137 wt % (based on final polymer weight) of hindered phenol stabilizer used in Example 2 was included in the reactor charge. The dipropylene glycol level of this polymer was 4.0 mole %.

Comparative Example E also makes high DPG PTT with added stabilizer. A polymer was prepared as described in Example C except that 0.025 wt % Irganox 1076 hindered phenol stabilizer was used. The initial DPG level of this polymer was 3.3 mole %.

Comparative Example F shows the preparation of PTT with very high DPG. A high DPG-content 1,3-propanediol was prepared by adding 0.1 g of p-toluenesulfonic acid to 500 g of PDO, degassing with nitrogen, and heating in a 200° C. oil bath for about 2 hours. Gas chromatography of the product showed about 78% PDO, 19% DPG and 3% higher ether diols.

A 1 liter stainless steel pressure reactor fitted with a distillation column, condenser and collection vessel was charged with 222g of the high DPG 1,3-propanediol and 346 g terephthalic acid (about 1.25 mole), 0.21 g Irgafos 168 (an organophosphite, 0.05 wt %) and 0.107 g of Irganox 1076. The reactor was pressurized to 50 to 80 psi with nitrogen and released pressure three times to degas, then repressurized to 20 psi, and heated to 250° C. For the first hour, the pressure was maintained near 50 psi and then lowered in about 5 psi increments every 15 minutes thereafter. After a total of about 3 hours, any pressure was released and the molten oligomer was poured into a pan and cooled.

The oligomer (140 g) and 0.074 g titanium butoxide (85 ppm based on Ti) were charged to a 500 mL 3-neck flask. The flask was degassed with nitrogen, evacuated to about 200 mbar with a small nitrogen sweep, heated in an oil bath to 260° C., stirred at about 20 rpm, and the pressure was reduced to about 2 mbar. After 3 hours, the reaction mixture was cooled and the polymer was isolated. Intrinsic viscosity (i.v.) measured in hexafluoroisopropanol was 1.15. NMR showed about 14.2 wt % (29 mole %) DPG-type units in the final polymer.

A similar polymer, Example G, was made with the high DPG PDO, except that no phosphite or hindered phenol was added. The i.v. was 1.08 and the polymer contained about 14.6 wto DPG-type units. Table 14 shows the headspace GC results for Examples F and G.

TABLE 14

| Ex. | Stabilizer | Under Nitrogen | | Under Air | |
| --- | --- | --- | --- | --- | --- |
| | | Acrolein (ppm) | Allyl alcohol (ppm) | Acrolein (ppm) | Allyl alcohol (ppm) |
| F | Yes | 214 | 4.2 | 702 | 5.1 |
| G | No | 139 | 3.5 | 684 | 4.6 |

We claim:

1. Polytrimethylene terephthalate polymer characterized by a dipropylene glycol unit content of 1.0 to 1.8 mole percent, based on total diol units.

2. The polymer of claim 1 wherein the intrinsic viscosity, as measured in a solution of 0.4 g polymer in 100 ml of a 60:40 solution of phenol:tetrachloroethane at 30° C. is 0.6 dl/g or greater.

3. The polymer of claim 1 wherein some of the polymer chains have at least one terminal stabilizer group.

4. Polytrimethylene terephthalate polymer characterized by a dipropylene glycol unit content of 1.0 to 1.8 mole percent, based on total diol units, wherein some of the polymer chains have at least one terminal stabilizer group which has the formula

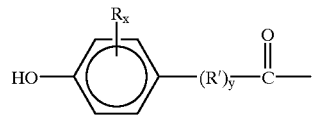

in which R is a $C_{1-12}$ alkyl group; x is an integer from 1 to 4; at least one R group is ortho to the phenolic hydroxyl group; R' is —$(CH_2)$— or alkyl-substituted methylene; and y is an integer from 1 to about 20.

5. The polymer of claim 4 wherein the $C_{1-12}$ alkyl group is selected from the group consisting of methyl, ethyl, isopropyl, t-butyl, t-amyl, and 2-phenyl-2-propyl.

* * * * *